United States Patent [19]

Cimini, Jr. et al.

[11] Patent Number: 5,276,730
[45] Date of Patent: Jan. 4, 1994

[54] ACCESS METHOD FOR DISTRIBUTED DYNAMIC CHANNEL ALLOCATION IN MICROCELLS

[75] Inventors: Leonard J. Cimini, Jr., Howell; Gerard J. Foschini, South Amboy; Chih-Lin I, Freehold, all of N.J.

[73] Assignee: AT&T Bell Laboratories, Murray Hill, N.J.

[21] Appl. No.: 876,554

[22] Filed: Apr. 30, 1992

[51] Int. Cl.$^5$ .................... H04M 11/00; H04Q 7/00
[52] U.S. Cl. ........................................ 379/60; 455/33.1
[58] Field of Search ................ 379/56, 58, 59, 60; 455/8, 9, 16, 34.1, 33.4, 53.1, 33.1

[56] References Cited

U.S. PATENT DOCUMENTS

5,134,709  7/1992  Bi et al. .................... 455/33.1

OTHER PUBLICATIONS

V. H. MacDonald, "The Cellular Concept", Sell Sys. Tech. J., vol. 58, No. 1, Part 3, Jan. 1979, pp. 15–41.
F. Lotse et al., "Propagation Measurements for Microcells in Central Stockholm", Proc. of VTC '90, pp. 539–541.
D. A. McFarlane et al., "Microcellular Mobile Radio Systems", Br Telecom Technol. J., vol. 8, No. 1, Jan. 1990, pp. 79–84.
D. J. Goodman, "Trends in Cellular and Cordless Communications", IEEE Communications Magazine, Jun. 1991, pp. 31–40

*Primary Examiner*—Jin F. Ng
*Assistant Examiner*—William D. Cumming
*Attorney, Agent, or Firm*—Eli Weiss; Robert P. Marley

[57] ABSTRACT

A method of providing local autonomous control of channel allocation of a cellular telecommunications network. In one prior art method, which can be identified as the timid method, a channel is selected for use by an incoming user if it is not being used by any of the cells which surround it. Otherwise, another channel is selected according to the same rule. The channels are tested in random order and a call is blocked if all of the channels are in use. For heavy loading, because of the vagaries of the way the demand for channels occurs, this method can result in inefficient channel deployment. In another method, which can be identified as the aggressive method, a channel is selected for use by an incoming user even if that channel is currently being used in the surrounding cells. If the channel is in use, the incoming user "bumps" the current user off the channel in the timid mode. The "bumped" user is then forced to find and use another channel. With this method, an unreasonable number of reconfigurations and an unreasonable number of dropped calls can result, especially when the system is heavily loaded. This invention integrates the aggressive and timid methods to obtain the best of both: the former's improved performance and the latter's stability. Initially, the timid mode is used to look for a channel with acceptable interference. However, if the timid mode fails to obtain a channel, the call is not necessarily blocked. Instead, the mode of operation becomes more aggressive and the first channel tested that has only modest interference is taken. The "bumped" user on that channel then attempts to locate another channel. If the "bumped" user is unsuccessful, the incoming user must then retreat and is blocked.

10 Claims, 8 Drawing Sheets

ACCESS METHOD FOR DISTRIBUTED DYNAMIC CHANNEL ALLOCATION IN MICROCELLS

TECHNICAL FIELD

This invention relates generally to cellular and personal telecommunications networks and, more particularly to a cellular system having substantially increased capacity.

BACKGROUND OF THE INVENTION

To meet the anticipated explosion of wireless demand by public mobile telephone users, it is necessary to use microcellular systems which have substantial capacity.

At the present time, Fixed Channel Allocation (FCA) is used to obtain access to the channels in the cells in substantially all systems deployed around the world. With FCA, a fixed set of channels are assigned to each cell. However, FCA is rigid and not adaptable to satisfying a volatile, shifting channel demand. As cellular and personal telecommunication networks evolve toward microcells, the channel demand profile can experience rapid changes. The rigid nature of FCA can be a serious obstacle to providing a communication channel to a mobile user at the time it is needed. In addition, centralized control of a cellular network system is subject to undesirable delays and vulnerable to disruptions.

With microcellular systems and increasing numbers of mobile users, current frequency planning and network control are rapidly becoming impractical and burdensome. One possible solution to the network management problems created by the use of microcells is Dynamic Channel Allocation (DCA) where each channel is available for use in every cell. DCA adapts to local interference and traffic conditions and removes the need for frequency planning. However, channel quality can be impaired by a channel in a nearby cell and/or a weak signal strength and, a channel quality level which is below threshold will prevent a channel from being immediately accessed by an incoming user.

To operate a network using DCA centrally, as it is envisioned, could result in the computer based switching system being overwhelmed. Specifically, the software manageability problem could be particularly acute. Moreover, for a centrally controlled DCA system, an elaborate network infrastructure for handling channel access information would be required. Additionally, reliance on central decisions tends to make a network vulnerable to failure and, at this time, there is a growing need for a reliable network. Furthermore, central control creates delays which are objectionable because timely channel access is critical.

Local autonomous control of channel access, where decisions are made by mobile telephones and/or bases rather than centrally, can result in most of the switching burden being removed and allow more handoffs to be accommodated faster. However, there are some very serious concerns about permitting local autonomy. One concern is that the algorithms may be unstable because uncoordinated users could work at counter-purposes to each other where each continually undermines what the other is attempting to achieve. A more serious concern is that during periods of peak demand, unstable cascades of reconfigurations of channel assignments can be inadvertently triggered which will take down the entire network when it is needed most. Even if local autonomous control would work, there is serious concern that there would be a serious performance penalty associated with using local instead of ideal central control.

Thus, local autonomously implemented DCA is an enticing concept, but is viewed as being potentially troublesome if not done correctly.

An improved distributed dynamic channel allocation method is required for use in microcellular communications which provides improved operation.

SUMMARY OF THE INVENTION

This invention is a method of providing local autonomous control of channel allocation of a cellular telecommunications network by integrating aggressive and timid methods to obtain the best of both: The former's improved performance and the latter's stability. Initially, a channel is selected for use by an incoming user if it is not being used by any of the neighboring cells. Otherwise, another channel is selected according to the same rule. The channels of a cell are tested in a random order. If an available channel is not located, the method then becomes aggressive. The channels are again tested and a channel is selected for use by the incoming user even if that channel is currently being used by an interferer. If the channel selected is in use, the incoming user "bumps" the current user (the interferer) off the channel. The "bumped" user is then forced to find and use another channel. The bumped user attempts to locate a channel in a surrounding cell which is not being used. In the event the "bumped" user cannot locate an unused channel, the incoming user must retreat and is blocked, and the "bumped" user regains control of the original channel.

DETAILED DESCRIPTION

Cellular and personal telecommunications networks must be capable of growing to serve many thousands of users within a local service area, such as a city. A concept which has helped contribute to the growth of the cellular system is frequency reuse.

Frequency reuse refers to the use of radio channels on the same carrier frequency to cover different areas which are separated from one another by sufficient distances to prevent objectionable co-channel interference. Briefly, instead of covering an entire local area from one land transmitter site with high power at a high elevation, the service provider can distribute transmitters of moderate power throughout the coverage area.

Each site then primarily covers some nearby sub-area or "cell". A cell thus signifies the area in which a particular transmitter site is the site most likely to serve mobile-telephone calls.

Figure 1:
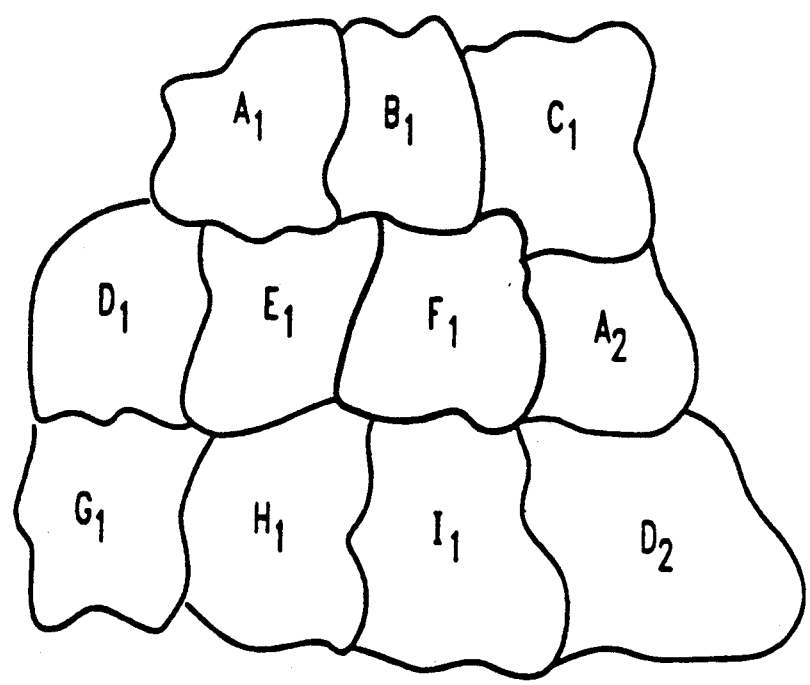
FIG. 1 illustrates a cellular map or layout.

Referring to FIG. 1, there is illustrated a cellular map or layout. In principle, the spacing of transmitter sites does not need to be regular, and the cells need not have any particular shape. Cells identified with different letters must be served by distinct sets of channel frequencies to avoid interference problems. Cells sufficiently far apart, such as those labeled $A_1$ and $A_2$ may use the same channel.

Through frequency reuse, a cellular telecommunications network can handle a number of simultaneous calls which greatly exceed the total number of allocated channel frequencies. The multiplier by which the system capacity in simultaneous calls exceeds the number of allocated channels depends on several factors, one being the total number of cells.

A significant increase in capacity with the limited spectrum that is available is to use the concept of microcells. Microcells can be defined as small coverage areas served by relatively small and inexpensive radio ports.

In outdoor applications, the radio ports (microsites) may be housed in pole-mounted canisters lining streets and roadways and separated by distances of up to a few hundred meters. These small distances, combined with frequency reuse techniques, permit enormous increases in communications capacity. An obvious application of microsites is urban areas, with high densities of subscribers demanding anywhere/anytime communications, both in vehicle and on foot.

In a publication entitled "Microcellular Mobile Radio Systems" by D. A. McFarlane in Br. Telecom Technol. J., Vol. 8, No. 1, January 1990, pages 79-84; there appears a presentation of microcellular networks cell types and hand over issues. On "cell types", the authors envision future high capacity cellular telecommunications networks to include many diverse types of cells which will vary in size from macrocells to picocells. McFarlane et al. clearly addresses the major issue that must be resolved. On page 80 of the publication the authors state that the one key feature which will decide whether microcellular systems are viable is the ability to handover calls from microcell-to-microcell while in progress. Unless this can be achieved reliably, the other advantages of microcellular systems cannot be exploited.

As noted previously, microcellular systems have the potential for a substantial increase in capacity. However, existing frequency planning and network control impose undeserved limitations of these systems. The solution to the network management problems created by the use of microcells is here referred to as Dynamic Channel Allocation (DCA) with Distributed Control. More specifically, Dynamic Channel Allocation is where every channel, whether a channel is a frequency and/or a time slot, is available for use in every cell and adapts to local interference and traffic conditions without requiring a need for frequency planning. Unfortunately, dynamic channel allocation is classically performed by a central switch which can be easily overloaded in a microcellular system. Distributed control, where decisions are made by the mobiles and/or bases, and not centrally, can not only remove much of the switching burden, but can also allow more handoffs to be accommodated faster. Dynamic channel allocation with distributed control is here identified as Local Autonomous Dynamic Channel Allocation (LADCA).

With this invention, microcellular networks can self-organize with little loss in capacity relative to the best globally coordinated channel selection, and this can be done by using a simple channel-allocation procedure where the mobile or portable unit makes autonomous decisions based only on local observations. Propagation and interference considerations are represented with the constraint that, if a channel is used in a given cell, it cannot be used in a ring of cells around that cell. Two methods for providing local autonomous control of channel allocation of cellular network are the timid method, and the aggressive method.

With the timid method, a portable unit takes a channel only if there is no nearby user or interferer on that channel. With the aggressive method, the portable unit may take a channel even if an interferer is present. If an interferer is present, he is "bumped". Naturally, the interferer must now search for another channel. At the expense of additional reconfigurations or intracell handoffs per call, use of the aggressive method can approach the capacity achieved with a global channel-allocation strategy.

Figure 2:
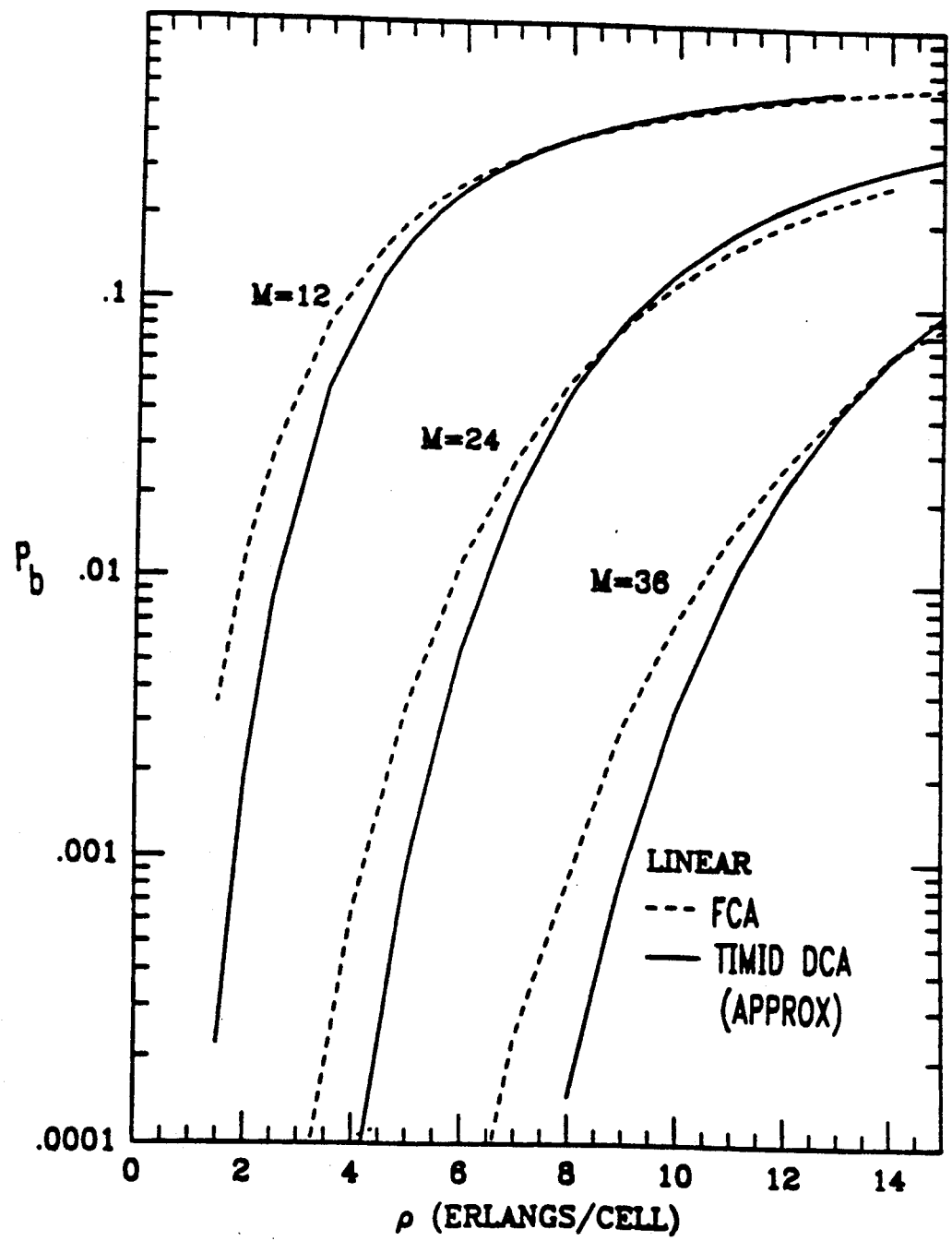
FIGS. 2 and 3 are plots of the blocking performance of a timid dynamic channel allocation algorithm wherein $P_b$ is illustrated as a function of p for M=12, 24, and 36 channels for linear (FIG. 2) and planar (FIG. 3) arrays of microcells.

FIG. 2 illustrates the blocking performance of the timid dynamic channel allocation (DCA) method. In FIG. 2, $P_b$, the blocking probability is plotted as a function of $\rho$, the load per cell; for $M=12$, 24 and 36 for linear arrays of microcells. In all instances, the plot of the timid dynamic channel allocation method represented by the solid lines, is seen to compare favorably with the fixed channel allocation (FCA) method represented by the dash line. This is particularly true around $P_b=10^{-2}$, a likely operating level for future systems.

Figure 3:
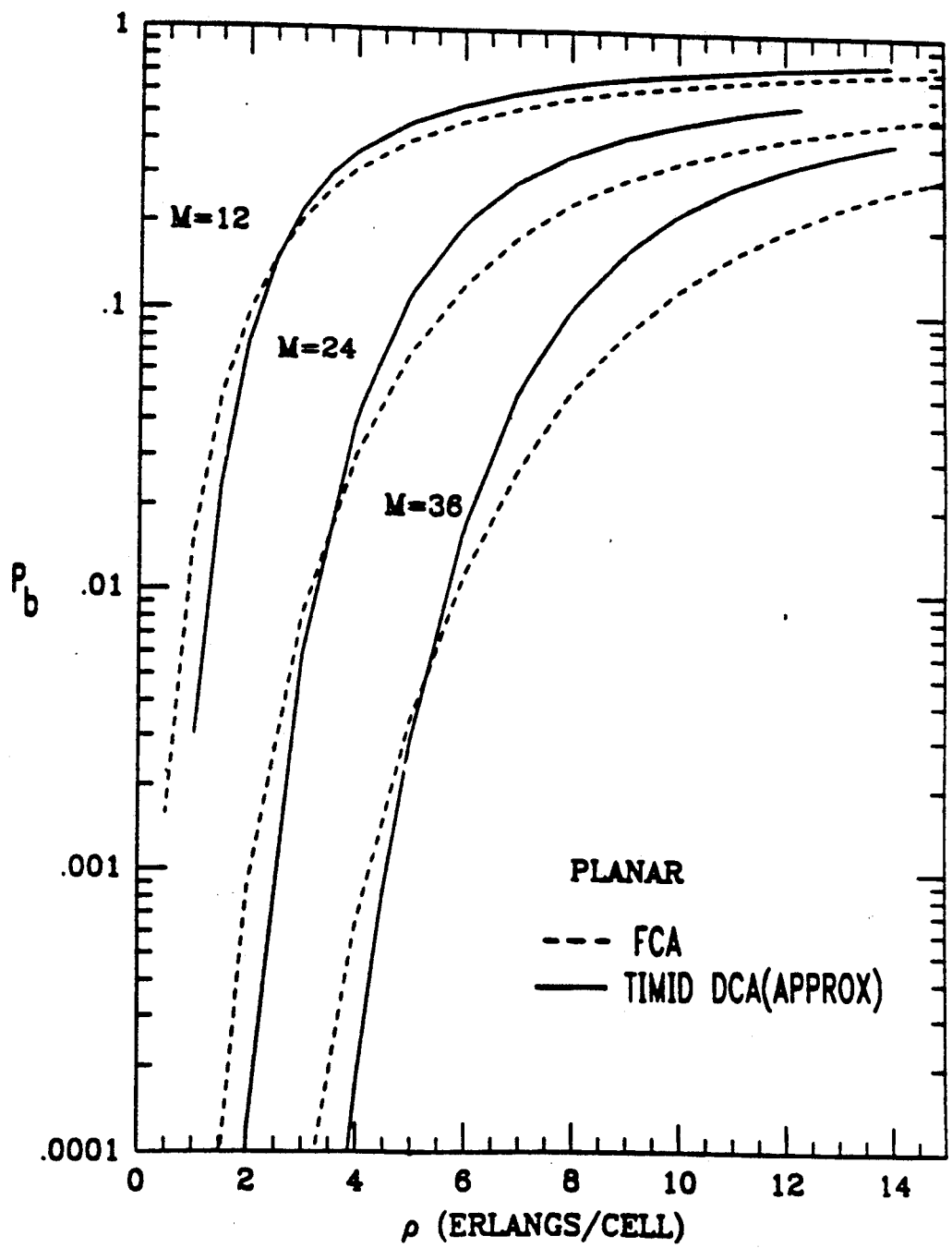

FIG. 3 is similar to FIG. 2 except that it is for a planar array of microcells rather than for a linear array of microcells.

As anticipated, for very light loading, dynamic channel allocation performs better than fixed channel allocation. In the loading region of interest, dynamic channel allocation can handle spatially localized channel demands since all M channels are available for use in every cell (subject, of course, to the reuse constraint). On the other hand, fixed channel allocation can have at most M/N users per call where N is the reuse factor. The reuse factor can be related to the number of buffer rings of cells, R, as follows: In the linear case, $N=R+1$. In the planar case, $N=i^2+ij+j^2$ where i and j are integers. For R odd, $i=j=(R+1)/2$ and, for R even, $i=R/2$ and $j=R/2+1$.

For FCA, a demand which exceeds this amount is blocked even though there may be channels available in an adjacent cell. However, for heavy loading, because of the vagaries of the way the channel demand presents itself, the dynamic channel allocation method can commit to an inefficient channel deployment which fixed channel allocation will rigidly prevent. As the number of channels increases, the crossover point occurs at a lower and, therefore, at a more significant $P_b$. In FIG. 3, for the linear case, a 100-cell network was used while, in FIG. 4, which is similar to FIG. 3 is for the planar case, a 28×24 hexagonal array was used.

Figure 4:
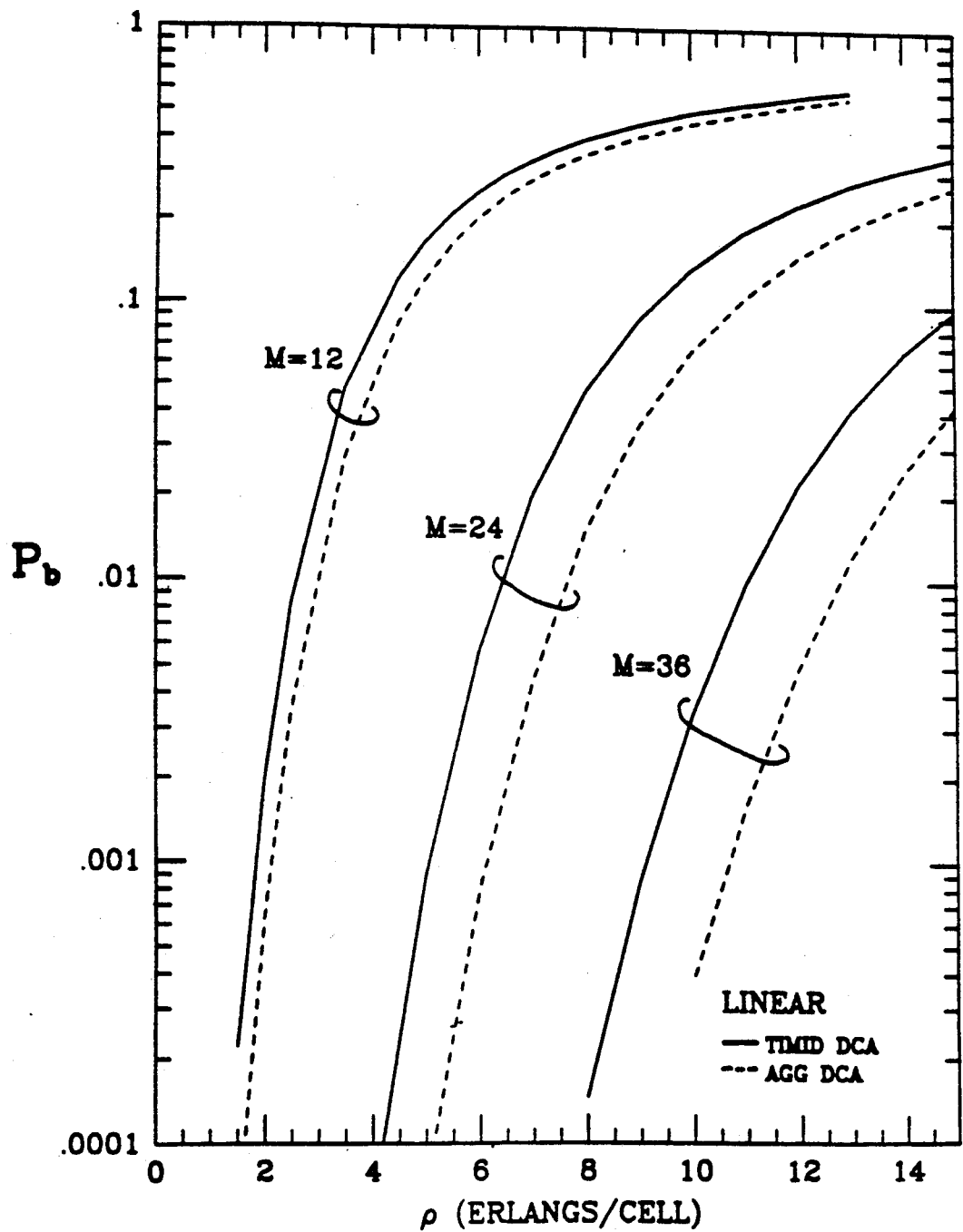
FIGS. 4 and 5 are plots of the upper and lower bounds on the blocking performance of dynamic channel allocation algorithms for linear (FIG. 4) and planar (FIG. 5) arrays of microcells.
Figure 5:
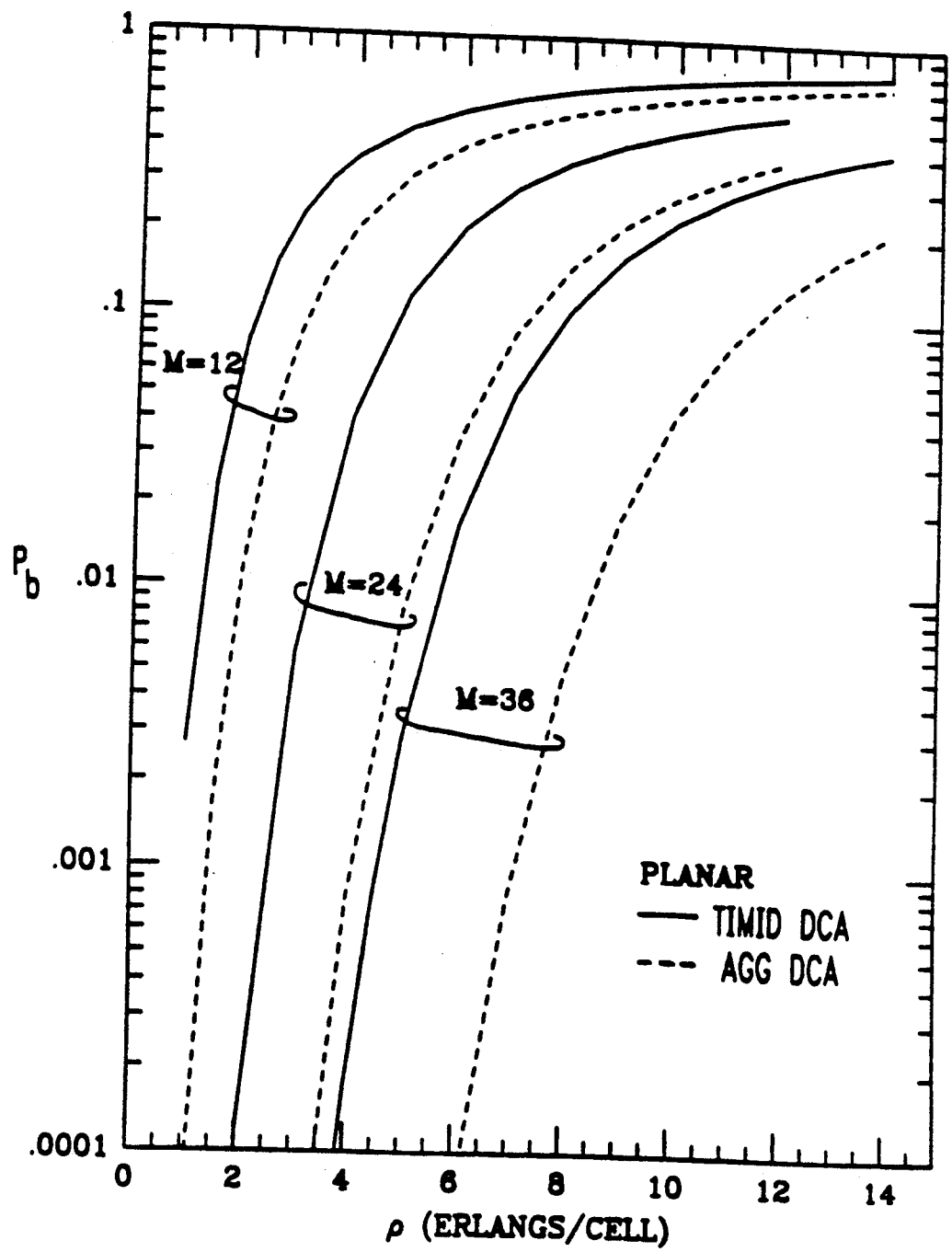

As noted previously, with an aggressive dynamic channel allocation method, the traffic performance can be improved by allowing an incoming user to take a channel even though it is being used nearby. Hopefully, in most situations of interest where $P_b$ is small, the user who has been intruded upon by an incoming user will have another channel available. However, this improvement is at the expense of additional reconfigurations during a call, and at the expense of dropped calls. Calculated results are illustrated in FIG. 4 for the linear case and in FIG. 5 for the planar case. The curves for the timid method and the lower limit on the aggressive type of method delimit the possible traffic characteristics for dynamic channel allocation methods. Any potential method will have a performance somewhere between these two curves. As shown, the aggressive limit shows substantial improvements in performance, especially in the planar case. It is to be noted that, at the lower value of loading, the improvement in performance using the aggressive method is essentially linear for M for linear arrays; and exponential for M for planar arrays.

The improvement can also be interpreted as a savings in the number of channels required to achieve a desired blocking probability objective. A limit on the channel savings is about 14% in the linear case and about 30% in the planar case. For example, for a planar array of cells, the aggressive method with $M=24$ performs only slightly worse than the timid method with $M=36$. This represents a channel savings of about 30%.

Significant improvement of the blocking probability can be obtained by using a more aggressive method. However, and especially in a heavily loaded system, an unstable situation may occur as the result of an unreasonable number of reconfigurations and an unreasonable number of dropped calls. It has been disclosed that, by carefully integrating the aggressive and timid method, the best of both is attainable, that being the former's improved performance and the latter's stability.

A method of this type can be as follows: initially the method operates in the timid mode, looking for a channel with no interference. However, when the timid method fails to obtain a channel, the call is not necessarily blocked. Instead, the method turns aggressive and takes the first channel it investigated that had only one interferer or user. The "bumped" user on that channel now tries to locate another channel but does so using only the timid method. If the "bumped" user is unsuccessful, the intruder must retreat and be blocked. This is called the "1-persistent" method. A variation of this is that m of the M-channels can be investigated in this way. It is here understood that M represents the total number of channels of a cell and m represents an arbitrary number of channels from one up to and including M channels of that cell. This is called the "m-persistent" method.

Figure 6:
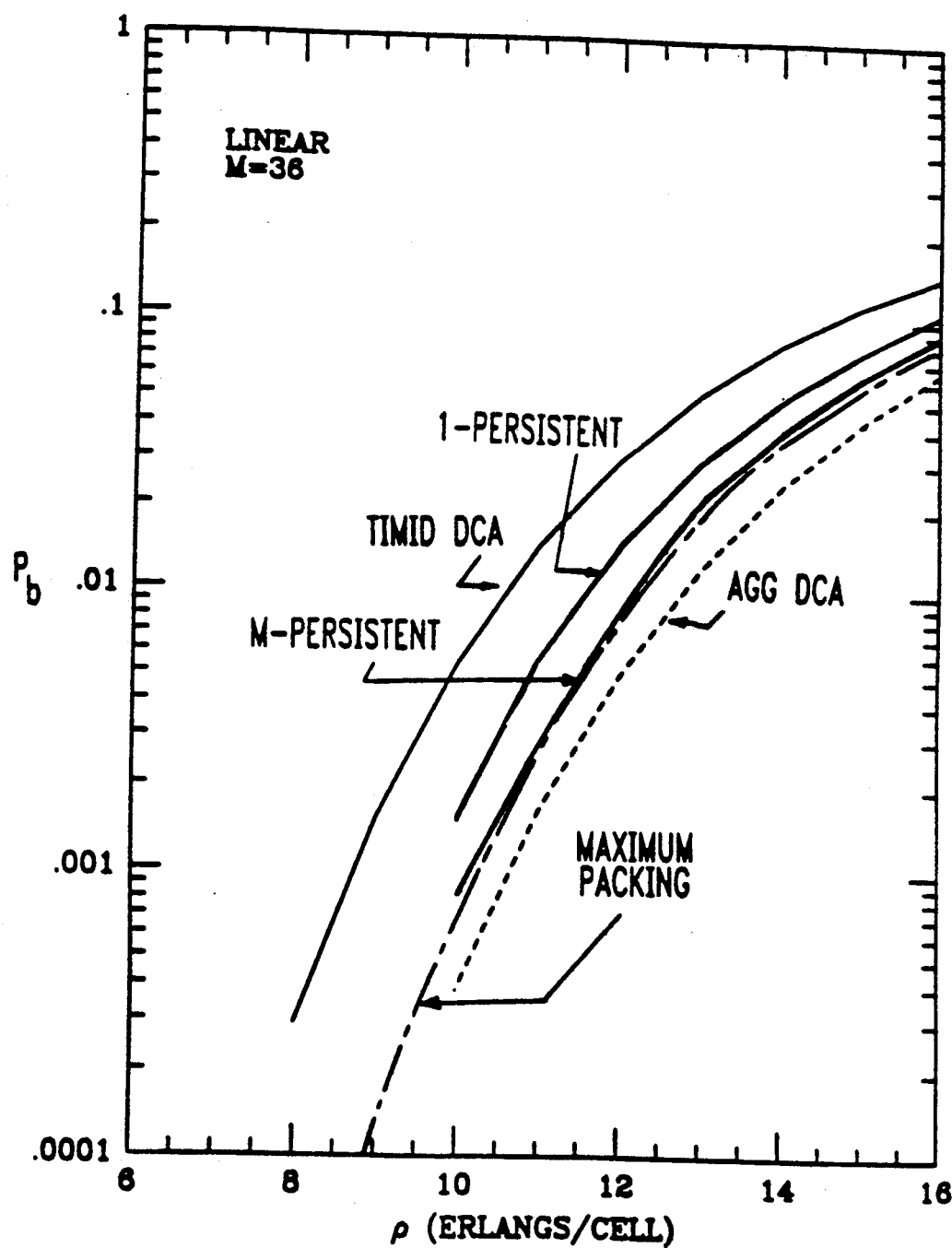
FIGS. 6 and 7 are plots of the blocking performance of 1-persistent and M-persistent methods for a linear (FIG. 6) and planar (FIG. 7) arrangement of microcells; and, FIG. 8 is a flow diagram of a method of providing local autonomous control of channel allocation of a cellular telecommunications network in accordance with the principle of the invention.
Figure 7:
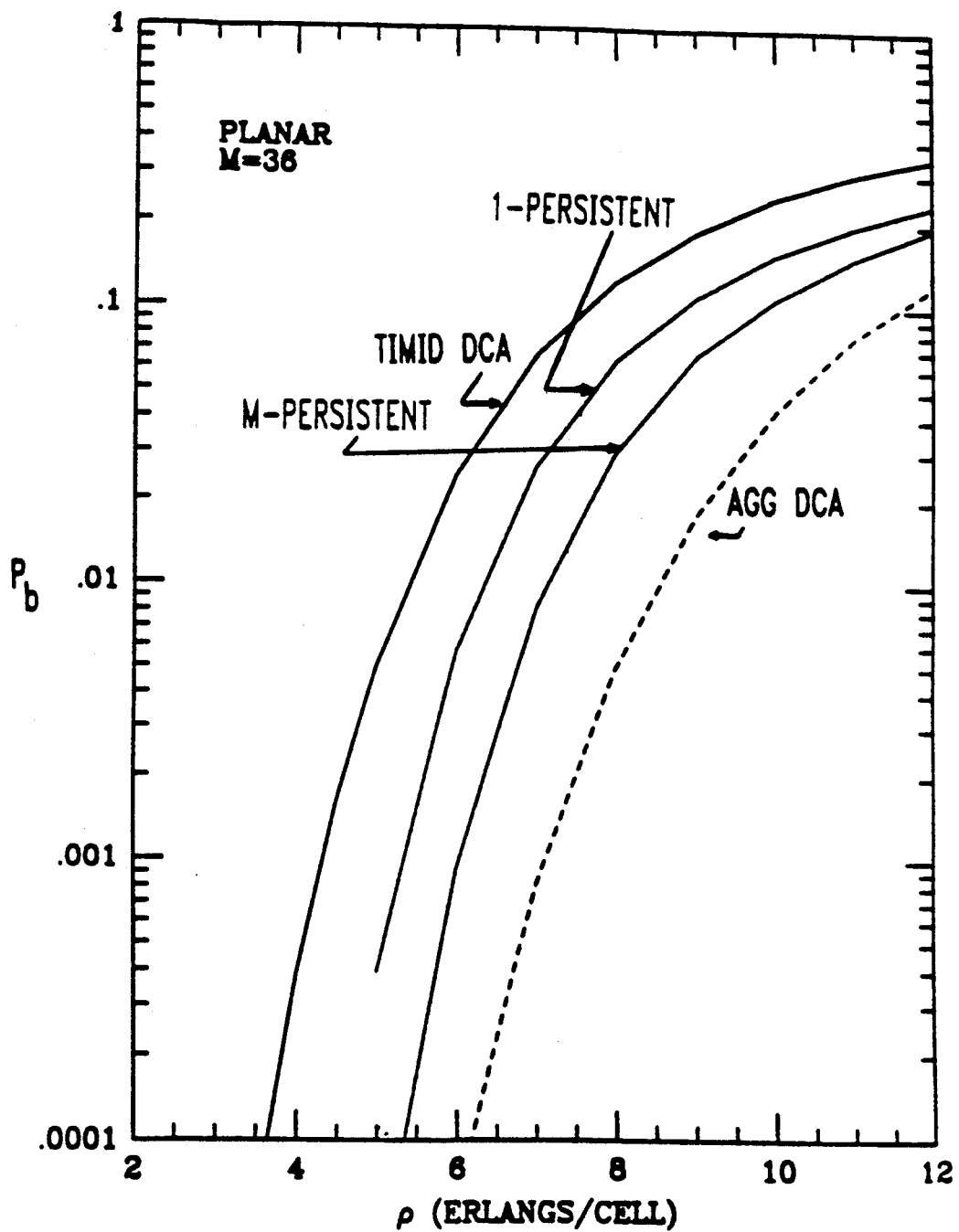

Calculated results using the 1-persistent and M-persistent methods are illustrated in FIGS. 6 and 7 for a linear and planar array of calls, respectively, $M=36$ channels. FIGS. 6 and 7 clearly illustrate that the 1-persistent and M-persistent methods can provide, especially in the planar case, a significant reduction in $P_b$ at the expense of, at most, one call reconfiguration per channel accessed. In particular, the M-persistent method is always better than the fixed channel allocation and goes a long way toward achieving the results of the aggressive method, with no dropped calls.

Furthermore, the M-persistent method achieves a large percentage of the total possible channel savings. For example, in the linear case, at $P_b = 10^{-2}$, the M-persistent method achieves the same performance as the timid method with $M=40$, a 10% savings. In the planar case, the M-persistent method is equivalent in blocking probability to a timid method using $M=44$, a savings of about 19%.

Figure 8:
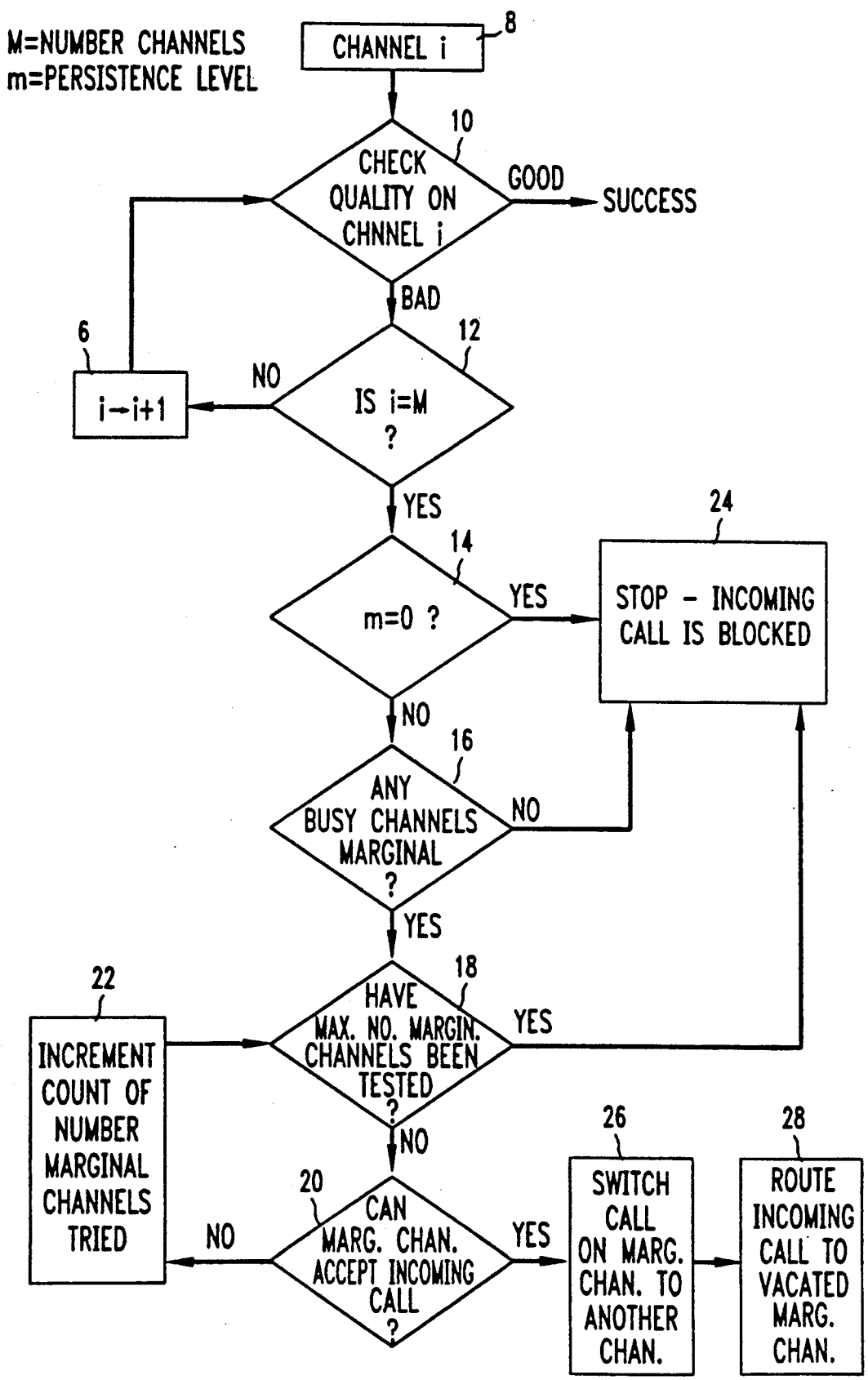

Referring to FIG. 8, there is illustrated the sequence of events for the method here disclosed for providing local autonomous control of channel access, where the decisions are made by the mobiles and/or bases rather than centrally. This method is a Local Autonomously implemented Dynamic Channel Allocation method and is here identified as LADCA.

Specifically, the invention is a class of m-persistent LADCA methods defined as follows: The parameter m can be thought of as being the level of aggressiveness as well as the level of persistence. A user gets access to a channel provided that, by doing so, the channel quality constraint is not violated. One-by-one, all channels are tested until a channel is found which meets the required quality. If this procedure is unsuccessful, then the users associated with channels of marginal quality are selected one-by-one in order to determine if one of them can be reconfigured to admit the incoming call. In one embodiment, the reconfiguration process is not permitted to cause another reconfiguration; no ripple. Up to a maximum of m neighbors are intruded upon in this way until one is found that can be reconfigured. An intruded upon user detects a substantial drop in channel quality and attempts to reconfigure, if possible. If none of the m intruded upon users can help, the incoming call is blocked.

If M channels are available in the system, the parameter m can be set anywhere from zero to M. Consequently, the case where m=zero corresponds to the Timid method, and the case where m=M corresponds to a more aggressive method.

In a particular exercise of the method, the maximum number of channels permitted to be tentatively seized can actually be less then m. This is because only channels of marginal quality can be tentatively seized. The logical ordering of channels 1 to M can be randomly assigned by each user in a manner that is distinct from any physical ordering. The term physical ordering means an ordering on the basis of frequency or time slot.

In some situations it may be advantageous to have the method for the initial period to measure less than the full complement of M channels before moving into the very aggressive stage. In this way, channel access time may be reduced. It is to be noted that it is not necessary that a user belong to a cell based on spatial position; channel quality measurements alone can be used to make channel assignments with this invention.

Referring to FIG. 8, when an incoming call is initiated (operational block 8) (see operational block 8), a first channel is checked for quality at conditional branch point 10. If the quality of the first channel, $i=1$, checked is acceptable, the procedure stops and a connection can be made. If, however, the quality on the channel being checked is not acceptable, a test is made at conditional branch point 12 to determine if there are remaining channels which have not yet been checked. If it is assumed that there are ten separate channels, that is, $M=10$, then the value of i is changed at operational block 6 each time a new channel is tested until, if required, all of the designated channels have been tested. It is assumed that the next channel is channel two. Thereafter, at conditional branch point 10, a test is made of channel two to determine if it has acceptable quality. If it does, the process stops, the channel is identified, and a connection is made. If the channel does not have acceptable quality, the process continues until an acceptable channel is found, or all ten channels or some number less than all have been tested and found to have unacceptable quality. Now, if m, the persistance level is set at zero as noted at conditional branch point 14, which is the case for the timid method, the testing procedure stops and the incoming call is blocked (see operational block 24). But, if m, the persistence level is set to be greater than zero, then an examination is made at conditional branch point 16 to determine if any of the channels which were tested are of marginal quality. This step can either require that all of the channels are again surveyed to determine if any are marginal or this step may be performed on only those channels which were noted and recorded as being marginal during the intial tests.

If none of the channels are marginal, the process stops and the incoming call is blocked (as shown in operational block 24). If, however, there are marginal channels, then each of the marginal channels are tested to determine if access is possible. Conditional branch points 18 and 20, and operational block 22 advance the testing process through the marginal channels. At conditional branch point 20, if a marginal channel cannot be reconfigured to accept the incoming call, the count of marginal channels is incremented (operational block 22) and the next marginal channel is tested. If at conditional branch point 18 it is determined that the maximum number of marginal channels have already been tested without success, the process is stopped and the incoming call is blocked. Conditional branch point 20 determines if a marginal channel can be made available to the incoming call (the call presently the marginal channel can be successfully switched to another channel). If this is the case, the call presently on the marginal channel is switched to another line (operational block 26), and the incoming call is routed to the newly vacated marginal channel (operational block 28). A further step can be the testing of other channels for use by the displaced call using the timid method; and the incoming user is accepted only if the displaced call locates a channel.

Thus, there has been provided, in accordance with the present invention, a method of providing local autonomous control of channel allocation of a cellular telecommunications network that satisfies the objects, aims, and advantages which are desired. While the invention has been described in conjunction with a specific embodiment thereof, it is evident that many alternatives, modifications, and variations will be apparent to those skilled in the art in light of the foregoing description. Accordingly, all such alternatives, modifications, and variations which fall within the spirit and broad scope of the appended claims will be embraced by the principles of the invention.

We claim:

1. A method of providing local autonomous control of channel allocation of a cellular telecommunication network comprising the steps of
    testing a first number of channels of a cell to identify a channel which does not have a current user and can be used by an incoming user;
    retesting said channels, absent identifying a channel which is not being used, for a marginal channel having a current user with a signal less than a predetermined value and identifying said channel;
    transferring said incoming user to said marginal channel identified as having a current user with a signal less than a predetermined value;
    testing a second number of channels to identify a channel which does not have a user; and
    transferring said current user from said marginal channel to a channel of the second number of channels identified as not having a user.

2. The method of claim 1 further comprising the step of
    denying said incoming user access to a channel in the event that said current user is not transferred to a channel of said second number of channels.

3. The method of claim 2 wherein
    said first number of channels are in a first cell, and
    said second number of channels are in a cell other than said first cell.

4. The method of claim 3 wherein
    the testing and retesting of the channels are done sequentially.

5. The method of claim 3 wherein
    during the testing of said first number of channels, those channels which are being used by a current user are identified.

6. The method of claim 3 wherein,
    during the testing of said first number of channels, those channels which are being used by an interferer with a signal which is less than a predetermined value are identified.

7. The method of of claim 6 wherein said first number of channels of a cell of the cellular telecommunications network that are tested for the presence of a current user are less than the number of channels of the cell.

8. The method of claim 7 wherein, said first number of channels of a cell of the cellular telecommunications network that are retested for the presence of a user are less than the number of marginal channels identified as being accessed by a current user with a signal which is less than a predetermined value.

9. The method of claim 6 wherein
    said first number of channels of a cell of the cellular telecommunications network that are tested for the presence of a user are tested in a random order.

10. The method of claim 9 wherein the random order is distinct for each call.

* * * * *